United States Patent
Tsai et al.

(10) Patent No.: US 6,668,114 B2
(45) Date of Patent: Dec. 23, 2003

(54) AUTOMATIC DEVICE FOR ASSEMBLING FIBER COLLIMATORS

(76) Inventors: His-Hsun Tsai, 14F-1, No. 266, Wu-Ling Rd., Hsinchu (TW); Winyann Jang, No. 7, Alley 19, Lane 131, An-Her Rd., Histun District, Taichung (TW)

(*) Notice: Subject to any disclaimer, the term of this patent is extended or adjusted under 35 U.S.C. 154(b) by 55 days.

(21) Appl. No.: 10/104,234

(22) Filed: Mar. 22, 2002

(65) Prior Publication Data

US 2003/0179995 A1 Sep. 25, 2003

(51) Int. Cl.$^7$ .................................................. G02B 6/32
(52) U.S. Cl. .............................. 385/34; 385/33; 385/60
(58) Field of Search ................................ 385/34, 31, 24, 385/11, 33, 39, 60, 72

(56) References Cited

U.S. PATENT DOCUMENTS 6,400,867 B1 * 6/2002 Liu .............................. 385/33
6,469,835 B1 * 10/2002 Liu .............................. 385/33

* cited by examiner

Primary Examiner—Phan T. H. Palmer
(74) Attorney, Agent, or Firm—Pro-Techtor International

(57) ABSTRACT

An automatic device for assembling a fiber collimator. The fiber collimator includes a tubular holder, an optical fiber disposed at an end of the tubular holder, and a GRIN lens disposed at the other end of the tubular holder. The automatic device includes a screen, a laser light-source and a driving table. The laser light source emits a laser light to the GRIN lens to obtain a first elliptic pattern and a second elliptic pattern on the screen, wherein the first elliptic pattern has a first major axis and the second elliptic pattern having a second major axis. The driving table rotates the optical fiber until the first major axis of the first elliptic pattern is parallel to the second major axis of the second elliptic pattern.

3 Claims, 4 Drawing Sheets

AUTOMATIC DEVICE FOR ASSEMBLING FIBER COLLIMATORS

BACKGROUND OF THE INVENTION

1. Field of the Invention

The present invention relates in general to an automatic device for assembling fiber collimators.

2. Description of the Related Art

Referring to FIG. 1, a so-called pigtail includes a ferrule (14) and an optical fiber (11) inserted in the ferrule (14). A typical fiber collimator includes a tubular holder (12), a pigtail (11, 14) disposed at one end of the tubular holder, and a GRIN (Graded INdex) lens (13) disposed at the other end. The pigtail (11, 14) and the GRIN lens (13) are spaced apart. The optical fiber (11) has an inclined surface (111) while the GRIN lens (13) also has an inclined surface (131). Reference numeral (21) indicates laser light propagating in the optical fiber (11) and reference numeral (21') indicates the laser light propagating out from the GRIN lens (13). The emitted laser light (21') is collimated only when the two inclined surfaces (111, 131) of the optical fiber (11) and the GRIN lens (13) are parallel to each other. That is, the GRIN lens (13) is able to prevent the laser light (21') from diverging. Furthermore, the separation of the optical fiber (11) from the GRIN lens (13) causes an energy loss by light propagation.

Presently, the fiber collimators are assembled by manual labor, an inefficient and expensive method.

SUMMARY OF THE INVENTION

An object of the present invention is to provide an automatic device for assembling fiber collimators, thereby promoting the efficiency of manufacture and yield.

A fiber collimator includes a tubular holder, an optical fiber disposed at an end of the tubular holder, and a GRIN lens disposed at the other end of the tubular holder. The automatic device of the present invention includes a screen, a laser light source and a driving table. The laser light source emits a laser light to the GRIN lens to obtain a first elliptic pattern and a second elliptic pattern on the screen, wherein the first elliptic pattern has a first major axis and the second elliptic pattern having a second major axis. The driving table rotates the optical fiber until the first major axis of the first elliptic pattern is parallel to the second major axis of the second elliptic pattern.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
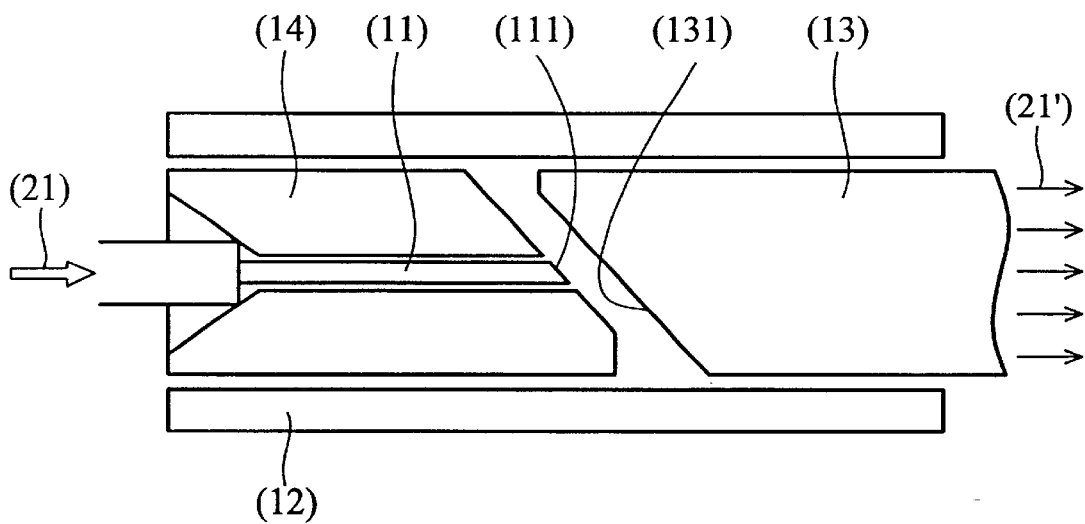
FIG. 1 is a schematic diagram of a conventional fiber collimator.
Figure 2:
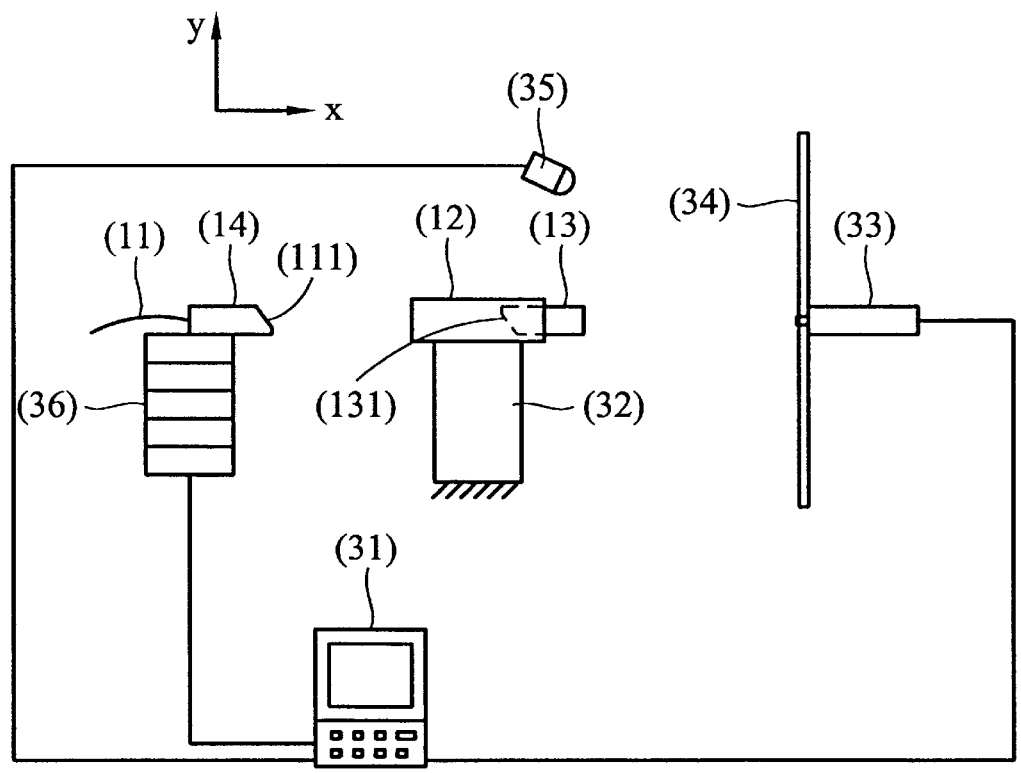
FIG. 2 depicts an automatic device of the present invention operating in a first manner for assembling a fiber collimator with an optical fiber parallel to a GRIN lens.

Referring to FIG. 2, a GRIN lens (13) is disposed in a tubular holder (12) and fixed via glue. The tubular holder (12) is mounted on a stationary stand (32). A pigtail (11, 14) is mounted on a multi-axis table (36). The multi-axis table (36) is able to move the pigtail (11, 14) in direction X and insert the pigtail (11, 14) into the tubular holder (12).

Figure 3:
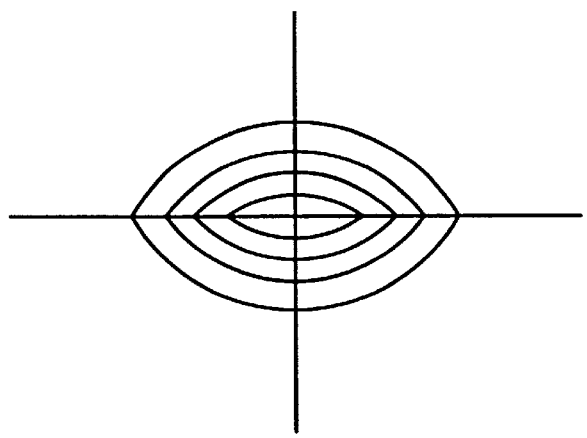
FIG. 3 depicts an elliptic pattern projected onto a screen in accordance with the present invention.

As mentioned above, the emitted laser light (21') is collimated when the inclined end surfaces (111, 131) of the optical fiber (11) and GRIN lens (13) are parallel to each other. In the present invention, therefore, the multi-axis table (36) further rotates the pigtail (11, 14) about the X axis until the inclined end surfaces (111, 131) of the optical fiber (11) and GRIN lens (13) are parallel to each other. The method of the present invention is as follows:

A visible laser light is emitted from a laser light source (33) to the GRIN lens (13). Apart of the laser light is reflected by the inclined surface (131) of the GRIN lens (13) onto a screen (34), generating an elliptic pattern (first pattern) on the screen (34), as shown in FIG. 3. The other laser light propagates through the inclined surface (131) of the GRIN lens (13) and is reflected by the inclined surface (111) of the optical fiber (11) onto the screen (34), generating another elliptic pattern (second pattern) on the screen (34). The two elliptic patterns on the screen (34) are observed by an image pick-up device (35) such as a CCD (Charge Coupled Device). The major (or minor) axes of the two elliptic patterns are parallel to each other when the inclined end surfaces (111, 131) of the optical fiber (11) and GRIN lens (13) are parallel to each other. Therefore, the multi-axis table (36) rotates the pigtail (11, 14) if the major (or minor) axes of the elliptic patterns are not parallel to each other. The image of the elliptic patterns is transmitted from the image pick-up device (35) to a personal computer (31). The personal computer (31) processes the image data and controls the operation of the multi-axis table (36) until the major (or minor) axes of the elliptic patterns are parallel to each other.

Figure 4:
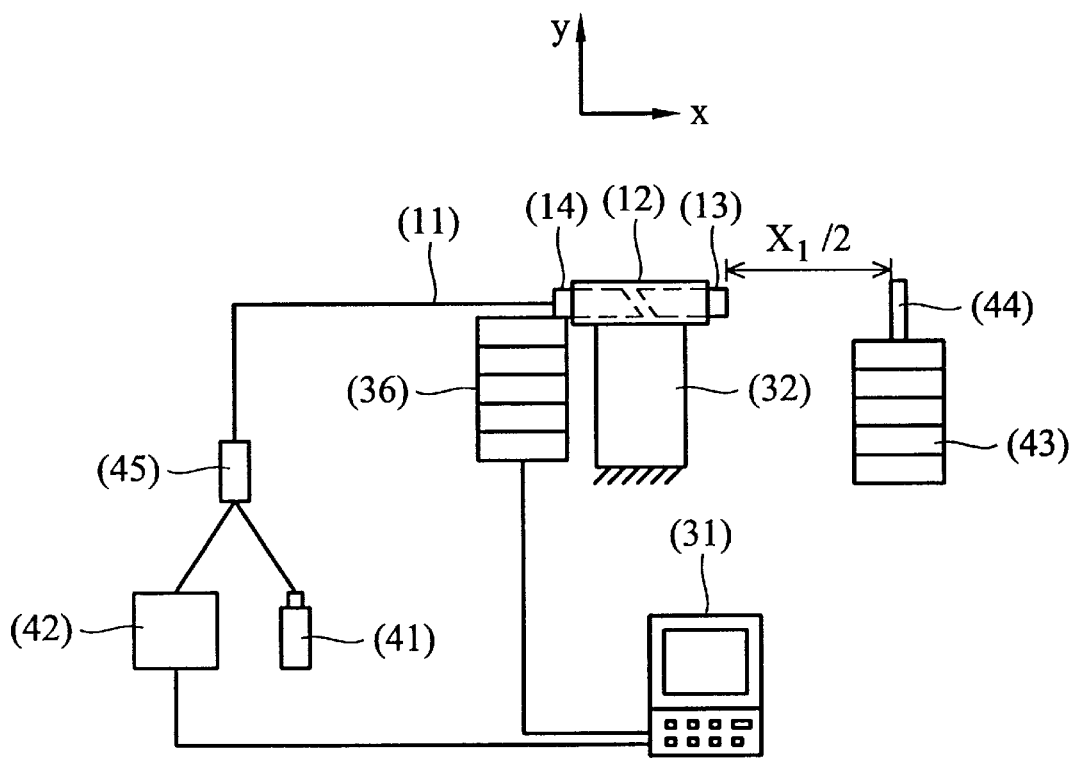
FIG. 4 depicts the automatic device of the present invention operating in a second manner for assembling a fiber collimator with a minimum energy loss of the laser light.

As mentioned above, the separation of the optical fiber (11) from the GRIN lens (13) causes an energy loss by light propagation, which needs to be predetermined and is specific to the fiber collimator. In the present invention, the distance between the optical fiber (11) and the GRIN lens (13) is adjusted in the following manner:

The laser light source (33) is terminated. Referring to FIG. 4, then, a reflective mirror (44) is disposed in front of the fiber collimator according to predetermined specification. In detail, if the specification is $x_1$ away from the fiber collimator for minimum light energy loss, then a multi-axis table (43) moves the reflective mirror (44) to the position of $x_1/2$ away from the fiber collimator. Then, a laser light source (41) emits a communication laser light. The laser light propagates through an optical coupler (45), the ferrule (14) and the GRIN lens (13), and is reflected by the reflective mirror (44) back to the GRIN lens (13). It is therefore understood that the travel distance for the laser light emitting out from the fiber collimator is $2(x_1/2)=x_1$, exactly equal to the predetermined specification. The laser light reflected back to the fiber collimator is measured by a detector (42). The light energy loss is calculated by the computer (31), and then the multi-axis table (36) is controlled by the computer (31) to move a small distance in direction x. The above operation is repeated until the minimum light energy loss is obtained. Then, the ferrule (14) is fixed via glue or soldering.

Figure 5A:
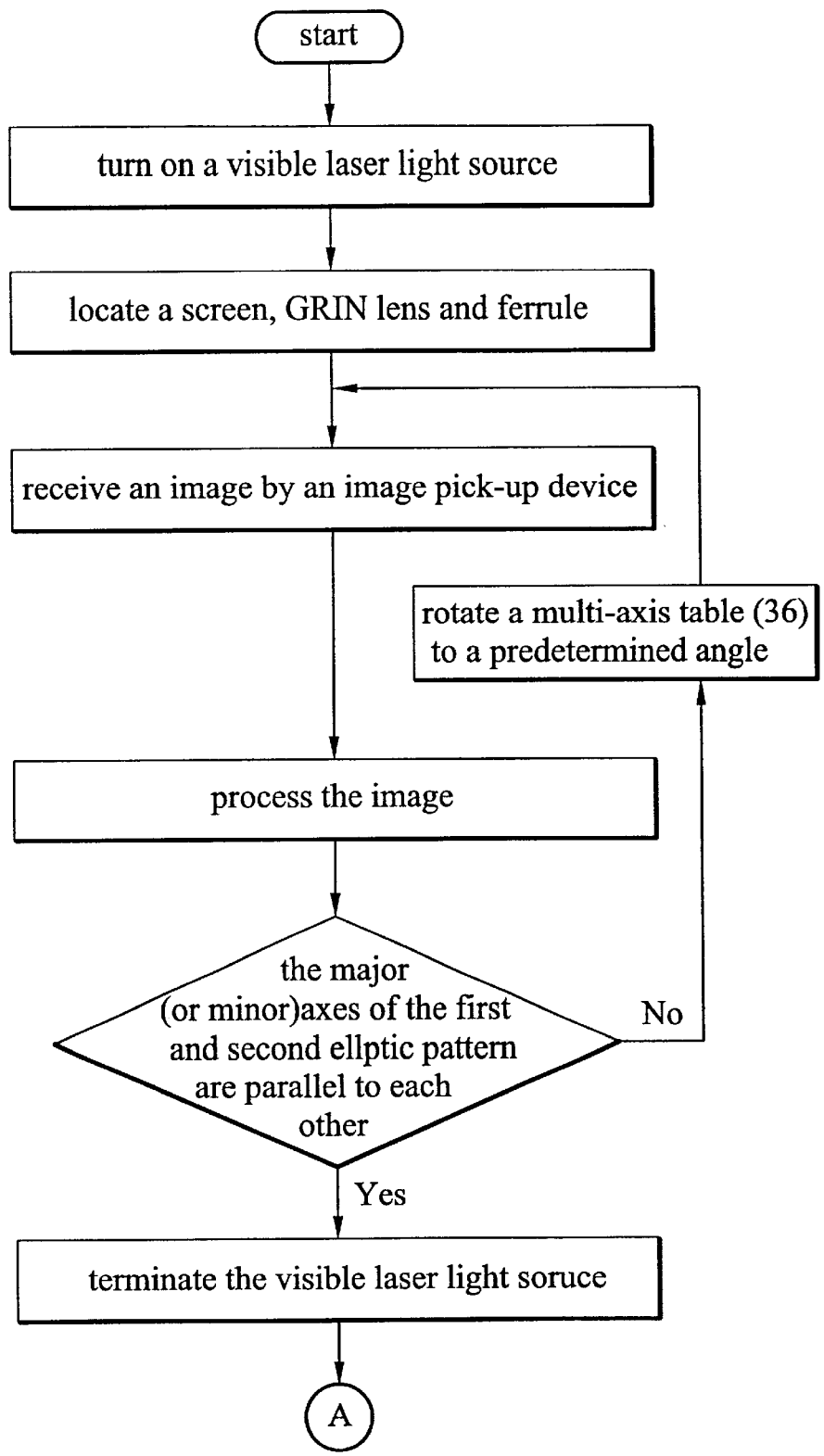
FIGS. 5A and 5B show a flow chart of assembling a fiber collimator in accordance with the present invention.
Figure 5B:
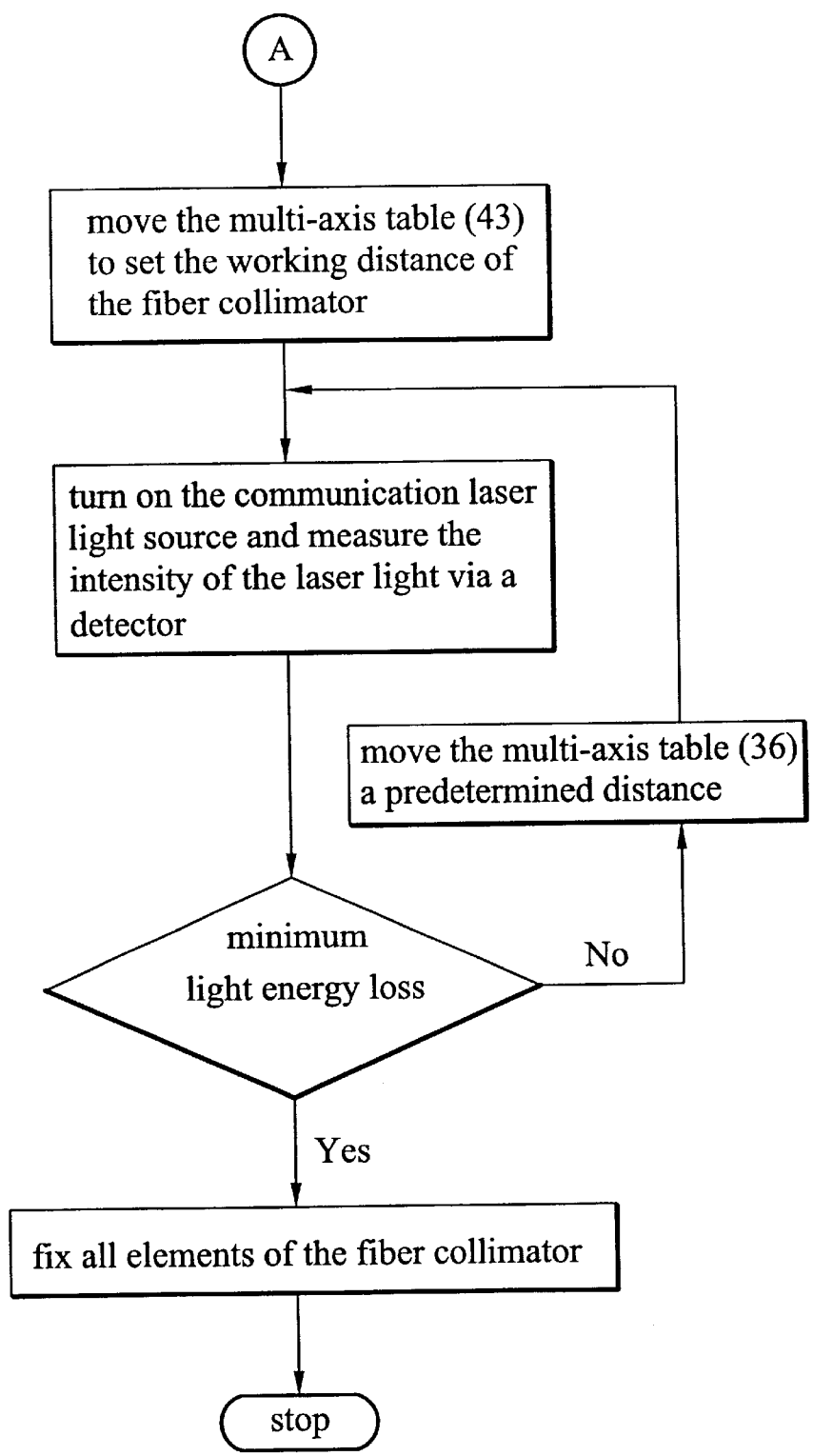

The operation process of the present invention is shown in FIGS. 5A and 5B.

In conclusion, the present invention provides an automatic device for assembling fiber collimators to promote the efficiency of manufacture and the yield.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic device for assembling a fiber collimator, the fiber collimator including a tubular holder, an optical fiber disposed at an end of the tubular holder, and a GRIN lens disposed at the other end of the tubular holder, the automatic device including:

a screen;

a laser light source emitting a laser light to the GRIN lens to obtain a first elliptic pattern and a second elliptic pattern on the screen, the first elliptic pattern having a first major axis and the second elliptic pattern having a second major axis;

a driving table rotating the optical fiber so that the first major axis of the first elliptic pattern is parallel to the second major axis of the second elliptic pattern;

an image pick-up device receiving images of the first and second elliptic patterns; and a processor processing the images to judge whether the first major axis is parallel to the second major axis, and then controlling the driving table to rotate the optical fiber until the first major axis is parallel to the second major axis.

2. An automatic device as claimed in claim 1, wherein the driving table further inserting the optical fiber into the tubular holder.

3. An automatic device for assembling a fiber collimator, the fiber collimator including a tubular holder, an optical fiber disposed at an end of the tubular holder, and a GRIN lens disposed at the other end of the tubular holder, the automatic device including:

a driving table for moving the optical fiber;

a reflective mirror disposed beside the GRIN lens by a predetermined distance;

a laser light source emitting a laser light, wherein the laser light propagates through the optical fiber and the GRIN lens, is reflected by the reflective mirror, and propagates through the GRIN lens back to the optical fiber;

a detector detecting the laser light propagating back to the optical fiber; and a processor connected to the detector for calculating an energy loss of the laser light propagating back to the optical fiber and for controlling the driving table to move the optical fiber until the energy, loss of the laser light propagating back to the optical fiber is minimum.

* * * * *